United States Patent [19]

Gindin et al.

[11] Patent Number: 5,596,044
[45] Date of Patent: Jan. 21, 1997

[54] HYDROXY-FUNCTIONAL PREPOLYMERS CONTAINING HYDANTOIN GROUP PRECURSORS AND THEIR USE IN COATING COMPOSITIONS

[75] Inventors: Lyuba K. Gindin, Pittsburgh; Douglas A. Wicks, Mt. Lebanon; Philip E. Yeske, Pittsburgh; E. Haakan Jonsson, Coraopolis, all of Pa.

[73] Assignee: Bayer Corporation, Pittsburgh, Pa.

[21] Appl. No.: 443,502

[22] Filed: May 18, 1995

[51] Int. Cl.$^6$ .......................... C08G 33/02; C08G 18/32; C08G 18/38; C07D 233/54
[52] U.S. Cl. .......................... 525/131; 427/385.5; 528/68; 548/317.1; 560/34; 560/160
[58] Field of Search .......................... 548/317.1; 560/934, 560/160, 131; 427/345.5; 528/68

[56] References Cited

U.S. PATENT DOCUMENTS

| | | | |
|---|---|---|---|
| 3,549,599 | 12/1970 | Merten, I | 260/77.5 |
| 3,639,418 | 2/1972 | Merten, I | 260/309.5 |
| 5,126,710 | 6/1992 | Zwiener et al. | 427/385.5 |

FOREIGN PATENT DOCUMENTS

| | | | |
|---|---|---|---|
| 2158945 | 5/1973 | Germany | 427/385.5 |

*Primary Examiner*—Floyd D. Higel
*Attorney, Agent, or Firm*—Joseph C. Gil; Thomas W. Roy

[57] ABSTRACT

The present invention relates to hydroxy-functional prepolymers containing urea groups and corresponding to the formula

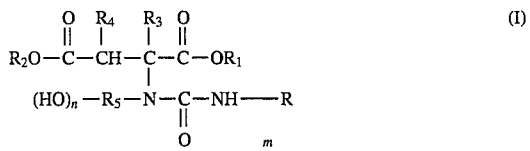

wherein R represents the residue obtained by removing the isocyanate groups from an organic monomeric diisocyanate, a polyisocyanate adduct or an NCO prepolymer containing hydantoin groups or hydantoin group precursors, $R_1$ and $R_2$ may be identical or different and represent organic groups which are inert towards isocyanate groups at a temperature of 100° C. or less, $R_3$ and $R_4$ may be identical or different and represent hydrogen or organic groups which are inert towards isocyanate groups at a temperature of 100° C. or less, $R_5$ represents the hydrocarbon radical obtained by removing the amino and hydroxyl groups from an amino alcohol, n has a value of 1 to 3 and m has a value of 2 to 6.

The present invention is also directed to compositions suitable for the production of coatings, adhesives or elastomers containing these polyhydantoin prepolymers in combination with optionally blocked polyisocyanates or aminoplast resins.

22 Claims, No Drawings

HYDROXY-FUNCTIONAL PREPOLYMERS CONTAINING HYDANTOIN GROUP PRECURSORS AND THEIR USE IN COATING COMPOSITIONS

BACKGROUND OF THE INVENTION

1. Field of the Invention

This present invention relates to hydroxy-functional prepolymers containing at least two urea groups, which may be converted to thermally stable hydantoin groups at elevated temperatures, and their use in combination with optionally blocked polyisocyanates and/or aminoplast resins for the production of polyurethanes and polyamides, respectively, especially as binders in coating compositions.

2. Description of the Prior Art

Coating compositions containing, as binders, optionally blocked polyisocyanates and/or aminoplast resins in combination with polyether, polyester or polycarbonate polyols are known. These compositions may also be used for the production of elastomers, potting compounds, composite matrices and in other related applications. One of the deficiencies of using these known polyols is that they do not possess sufficient thermal, chemical and hydrolytic stability.

Accordingly, it is an object of the present invention to provide improved polyol co-reactants for optionally blocked polyisocyanates or aminoplast resins which may be used to prepare products with improved thermal, chemical and hydrolytic stability.

This object may be achieved with the hydroxy-functional prepolymers according to the present invention, which contain urea groups that may be converted to thermally stable hydantoin groups at elevated temperatures.

The reaction of polyaspartates with polyisocyanates to form coatings is disclosed in U.S. Pat. No. 5,126,170. The polyisocyanates are blended with polyaspartates and then reacted after the mixture has been applied to a suitable substrate to form a urea group-containing coating. The coating is cured at low temperatures so that conversion of the urea groups to hydantoin groups does not take place.

In German Offenlegungsschrift 2,158,945 polyisocyanates are reacted with β-aminocarboxylic acid derivatives (which broadly encompass aspartates, see Example 7) to form open chain urea derivatives, which may subsequently be heated to form 6-membered 2,4-dioxohexahydro-pyrimidine derivatives.

U.S. Pat. No. 3,639,418 is directed to the reaction of bis-aspartates with monoisocyanates to form a urea intermediate which is then converted into the corresponding hydantoin by heating at elevated temperatures.

U.S. Pat. No. 3,549,599 is directed to carboxylic acid ester substituted polyhydantoins prepared by reacting stoichiometric amounts of polyaspartates with polyisocyanates and subsequently converting the urea groups to hydantoin groups. Unless chain terminating monoaspartates are used during their production, the resulting products are high molecular polymers, which may be crosslinked through the ester group remaining after hydantoin formation by transesterification or aminolysis reactions. In addition, this reference is primarily directed to the use of aromatic polyisocyanates to prepare the polyhydantoins. It can be shown that such polyhydantoins are inferior to the corresponding polyhydantoins prepared from (cyclo)aliphatic polyisocyanates with regard to viscosity and color of the polyhydantoins and the flexibility, color and weathering of the polyurethanes and polyamides prepared therefrom.

None of the preceding references suggests the preparation of the hydroxy-functional prepolymers according to the present invention or their use as co-reactants for optionally blocked polyisocyanates and/or aminoplast resins.

SUMMARY OF THE INVENTION

The present invention relates to hydroxy-functional prepolymers containing urea groups and corresponding to the formula

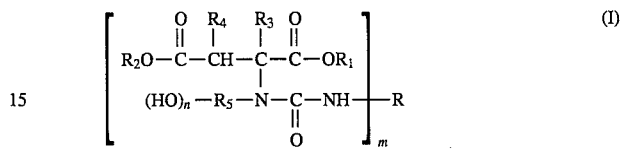

wherein

R represents the residue obtained by removing the isocyanate groups from an organic monomeric diisocyanate, a polyisocyanate adduct or an NCO prepolymer containing hydantoin groups or hydantoin group precursors, $R_1$ and $R_2$ may be identical or different and represent organic groups which are inert towards isocyanate groups at a temperature of 100° C. or less, $R_3$ and $R_4$ may be identical or different and represent hydrogen or organic groups which are inert towards isocyanate groups at a temperature of 100° C. or less, $R_5$ represents the hydrocarbon radical obtained by removing the amino and hydroxyl groups from an amino alcohol, n has a value of 1 to 3 and m has a value of 2 to 6.

The present invention is also directed to compositions suitable for the production of coatings, adhesives, elastomers, potting compounds or composite matrices containing these polyhydantoin prepolymers in combination with optionally blocked polyisocyanates or aminoplast resins.

DETAILED DESCRIPTION OF THE INVENTION

The hydroxy-functional prepolymers containing urea groups according to the invention are prepared by reacting a polyisocyanate with a hydroxy aspartate. Suitable polyisocyanate starting materials include monomeric diisocyanates and polyisocyanate adducts. Also suitable are NCO prepolymers containing hydantoin groups or hydantoin group precursors which may be prepared by reacting an excess of either the polyisocyanate adducts or the monomeric diisocyanates, preferably the monomeric diisocyanates, with polyaspartates.

Suitable monomeric diisocyanates may be represented by the formula $$R(NCO)_2$$

in which R represents an organic group obtained by removing the isocyanate groups from an organic diisocyanate having a molecular weight of about 112 to 1,000, preferably about 140 to 400. Diisocyanates preferred for the process according to the invention are those represented by the above formula in which R represents a divalent aliphatic hydrocarbon group having 4 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms.

Examples of suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)methane, 2,4'-dicyclohexyl-methane diisocyanate, 1,3- and 1,4-bis-(isocyanatomethyl)-cyclohexane, bis-(4-isocyanato-3-methyl-cyclohexyl)methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, 1,3- and/or 1,4-phenylene diisocyanate, 2,4- and/or 2,6-toluylene diisocyanate, 2,4- and/or 4,4'-diphenyl-methane diisocyanate, 1,5-diisocyanato naphthalene and mixtures thereof. Polyisocyanates containing 3 or more isocyanate groups such as 4-isocyanatomethyl-1,8-octamethylene diisocyanate and aromatic polyisocyanates such as 4,4',4"-triphenylmethane diisocyanate and polyphenyl polymethylene polyisocyanates obtained by phosgenating aniline/formaldehyde condensates may also be used.

Preferred organic diisocyanates include 1,6-hexamethylene diisocyanate, 1-isocyanato-3-isocyanatomethyl-3,5,5-trimethylcyclohexane (isophorone diisocyanate or IPDI), bis-(4-isocyanatocyclohexyl)methane, α,α,α',α'-tetramethyl-1,3- and/or-1,4-xylylene diisocyanate, 1-isocyanato-1-methyl-4(3)-isocyanatomethyl cyclohexane, 2,4- and/or 2,6-hexahydrotoluylene diisocyanate, 2,4- and/or 2,6-toluylene diisocyanate, and 2,4- and/or 4,4'-diphenyl-methane diisocyanate.

In accordance with the present invention the polyisocyanate component may also be in the form of a polyisocyanate adduct. Suitable polyisocyanate adducts are those containing isocyanurate, uretdione, biuret, urethane, allophanate, carbodiimide and/or oxadiazinetrione groups. The polyisocyanates adducts have an average functionality of 2 to 6 and an NCO content of 5 to 30% by weight.

1) Isocyanurate group-containing polyisocyanates which may be prepared as set forth in DE-PS 2,616,416, EP-OS 3,765, EP-OS 10,589, EP-OS 47,452, U.S. Pat. No. 4,288,586 and U.S. Pat. No. 4,324,879. The isocyanato-isocyanurates generally have an average NCO functionality of 3 to 3.5 and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a suitable catalyst, e.g., a trialkyl phosphine catalyst, and which may be used in admixture with other aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906,126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.5.

6) Isocyanurate and allophanate group-containing polyisocyanates which may be prepared in accordance with the processes set forth in U.S. Pat. Nos. 5,124,427, 5,208,334 and 5,235,018, the disclosures of which are herein incorporated by reference, preferably polyisocyanates containing these groups in a ratio of monoisocyanurate groups to monoallophanate groups of about 10:1 to 1:10, preferably about 5:1 to 1:7.

7) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

8) Polyisocyanates containing oxadiazinetrione groups and containing the reaction product of two moles of a diisocyanate and one mole of carbon dioxide.

The functionality of the polyisocyanates, which corresponds to "m" in formula I, is 2 to 6, preferably 2 to 4.

Preferred polyisocyanate adducts are the polyisocyanates containing isocyanurate groups, biuret groups and mixtures of isocyanurate groups with either allophanate or uretdione groups.

Suitable polyisocyanates that may be used for the production of the NCO prepolymers containing hydantoin groups or hydantoin group precursors are the previously described polyisocyanate adducts and preferably the monomeric diisocyanates. Suitable polyaspartates that may be used as starting materials for the production of these prepolymers include those corresponding to the formula:

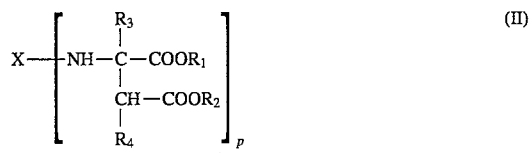

wherein

X represents an organic group which has a valency of p and is inert towards isocyanate groups at a temperature of 100° C. or less, preferably a hydrocarbon group obtained by removing the amino groups from an aliphatic, araliphatic or cycloaliphatic polyamine, more preferably a diamine, and $R_1$ and $R_2$ may be the same or different and represent optionally substituted hydrocarbon radicals, preferably an alkyl group containing 1 to 9 carbons and more preferably methyl, ethyl or butyl groups, $R_3$ and $R_4$ may be identical or different and represent hydrogen or organic groups which are inert towards isocyanate groups at a temperature of 100° C. or less, preferably hydrogen, and p has a value of at least 2, preferably 2 to 6, more preferably 2 to 4 and most preferably 2.

These polyaspartates may be prepared by reacting optionally substituted maleic or fumaric acid esters with polyamines. Suitable optionally substituted maleic or fumaric acid esters are those corresponding to the formula

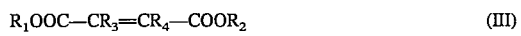

wherein $R_1$, $R_2$, $R_3$ and $R_4$ are as defined above.

Examples of optionally substituted maleic or fumaric acid esters suitable for use in the preparation of the polyaspartates include dimethyl, diethyl and dibutyl (e.g., di-n-butyl) esters of maleic acid and fumaric acid and the corresponding maleic or fumaric acid esters substituted by methyl in the 2- and/or 3-position.

Suitable polyamines for preparing the polyaspartates include those corresponding to the formula $$X—(—NH_2)_p \qquad \text{(IV)}$$

wherein X and p are as previously defined.

The polyamines include high molecular weight amines having molecular weights of 800 to about 10,000, preferably 800 to about 6,000, and low molecular weight amines having molecular weights below 800, preferably below 600. The molecular weights are number average molecular weights ($M_n$) and are determined by end group analysis (NH number). Examples of these polyamines are those wherein the amino groups are attached to aliphatic, cycloaliphatic, araliphatic and/or aromatic carbon atoms.

Suitable low molecular polyamines include ethylene diamine, 1,2- and 1,3-propane diamine, 2-methyl-1,2-propane diamine, 2,2-dimethyl-1,3-propane diamine, 1,3- and 1,4-butane diamine, 1,3- and 1,5-pentane diamine, 2-methyl-1,5-pentane diamine, 1,6-hexane diamine, 2,5-dimethyl-2,5-hexane diamine, 2,2,4-and/or 2,4,4-trimethyl-1,6-hexane diamine, 1,7-heptane diamine, 1,8-octane diamine, 1,9-nonane diamine, triaminononane, 1,10-decane diamine, 1,11-undecane diamine, 1,12-dodecane diamine, 1-amino-3-aminomethyl-3,5,5-trimethyl cyclohexane, 2,4- and/or 2,6-hexahydrotoluylene diamine, 2,4'- and/or 4,4'-diamino-dicyclohexylmethane, 3,3'-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane), 1,3- and/or 1,4-cyclohexane diamine, 1,3-bis(methylamino)-cyclohexane, 1,8-p-menthane diamine, hydrazine, hydrazides of semicarbazido carboxylic acids, bis-hydrazides, bis-semicarbazides, phenylene diamine, 2,4- and 2,6-toluylene diamine, 2,3- and 3,4-toluylene diamine, 2,4'- and/or 4,4'-diaminodiphenyl methane, higher functional polyphenylene polymethylene polyamines obtained by the aniline/formaldehyde condensation reaction, N,N,N-tris-(2-aminoethyl)-amine, guanidine, melamine, N-(2-aminoethyl)-1,3-propane diamine, 3,3'-diamino-benzidine, polyoxypropylene amines, polyoxyethylene amines, 2,4-bis-(4'-aminobenzyl)-aniline and mixtures thereof. Also suitable are amine-terminated polyethers having the required molecular weight such as the Jeffamine resins, e.g., Jeffamine D-230 and T-403, available from Huntsman.

Suitable high molecular weight polyamines include those prepared from the known polyhydroxyl compounds of polyurethane, especially the polyethers. The polyamines may be prepared by reacting the polyhydroxyl compounds with an excess of the previously described polyisocyanates to form NCO prepolymers and subsequently hydrolyzing the terminal isocyanate group to an amino group. Preferably, the polyamines are prepared by converting the terminal hydroxy groups of the polyhydroxyl compounds to amino groups, e.g., by amination. Preferred high molecular weight polyamines are amine-terminated polyethers such as the Jeffamine resins available from Huntsman.

Preferred polyamines are 1-amino-3-aminomethyl-3,5,5-trimethylcyclohexane (isophorone diamine or IPDA), bis-(4-aminocyclo-hexyl)methane, bis-(4-amino-3-methylcyclohexyl)-methane, 1,6-diamino-hexane, 2-methyl pentamethylene diamine, ethylene diamine, triaminononane, 2,4- and/or 2,6-toluylene diamine, 4,4'- and/or 2,4'-diaminodiphenyl methane and the Jeffamine D-230 and T-403 resins.

The preparation of the polyaspartates from the above mentioned starting materials may be carried out, for example, at a temperature of 0° to 100° C. using the starting materials in such proportions that at least 1, preferably 1, olefinic double bond is present for each primary amino group. Excess starting materials may be removed by distillation after the reaction. The reaction may be carried out solvent-free or in the presence of suitable solvents such as methanol, ethanol, propanol, tetrahydrofuran, dioxane, and mixtures of such solvents.

The NCO prepolymers containing hydantoin groups or hydantoin group precursors are prepared by reacting the polyisocyanates with the polyaspartates at a maximum equivalent ratio of isocyanate groups to aspartate groups (i.e., secondary amino groups) of 10:1, preferably 5:1 and more preferably 3:1 and a minimum equivalent ratio of isocyanate groups to aspartate groups (i.e., secondary amino groups) of 1.05:1, preferably 1.6:1, more preferably 2:1 and most preferably 2.1:1.

The reaction is preferably carried out by incrementally adding the polyaspartate to the polyisocyanate. The reaction to form the urea group-containing intermediate is conducted at a temperature of 10° to 100° C., preferably 20° to 80° C. and more preferably 20° to 50° C. After this addition reaction is complete the resulting NCO prepolymers contain hydantoin group precursors, i.e., urea groups, and may be used in this form for the preparation of the hydroxy-functional prepolymers containing urea groups.

If desired, the NCO prepolymers containing hydantoin group precursors may be converted to NCO prepolymers containing hydantoin groups. However, it must be ensured that the monoalcohol given off when the urea groups are converted to hydantoin groups does not react with the isocyanate groups of the NCO prepolymer to form blocked isocyanate groups. In this form the NCO prepolymer cannot be reacted with the hydroxy aspartates to form the hydroxy-functional prepolymers containing urea groups according to the invention. If it is desired to convert the urea groups to hydantoin groups, the reaction must take place at temperatures above the deblocking temperature of the isocyanate groups to prevent the formation of blocked isocyanate groups.

Suitable hydroxy aspartates that may be used as starting materials for the production of the hydroxy-functional prepolymers containing urea groups according to the invention are prepared by reacting optionally substituted maleic or fumaric acid esters with amino alcohols. Suitable optionally substituted maleic or fumaric acid esters are those previously set forth the production of the polyaspartates and corresponds to the formula $$R_1OOC—CR_3=CR_4—COOR_2 \qquad \text{(III)}$$

wherein $R_1$ and $R_2$ may be identical or different and represent organic groups which are inert towards isocyanate groups at a temperature of 100° C. or less, preferably an alkyl group containing 1 to 9 carbons and more preferably methyl, ethyl or butyl groups and $R_3$ and $R_4$ may be identical or different and represent hydrogen or organic groups which are inert towards isocyanate groups at a temperature of 100° C. or less, preferably hydrogen.

Examples of optionally substituted maleic or fumaric acid esters suitable for use in the preparation of the compounds corresponding to formula I include dimethyl, diethyl and dibutyl (e.g., di-n-butyl) esters of maleic acid and fumaric acid and the corresponding maleic or fumaric acid esters substituted by methyl in the 2- and/or 3-position.

Suitable amino alcohols for preparing the hydroxy aspartates are those containing one primary amino group and 1 to 3, preferably 1 hydroxy group, provided that the hydroxy group(s) are aliphatically (including araliphatically) or cycloaliphatically bound. These amino alcohols correspond to the formula

wherein $R_5$ represents the hydrocarbon radical obtained by removing the amino and hydroxyl groups from an amino alcohol and n has a value of 1 to 3, preferably 1.

Suitable amino alcohols include ethanolamine, 1-amino-2-hydroxypropane, 1-amino-3-hydroxypropane, 1-hydroxy-2-aminopropane and 1,3-propanolamine, the isomeric butanol amines, 2-amino-1,3-propane diol and 2-amino-2-hydroxymethyl-propane diol. The monohydroxy amines are preferred, especially ethanolamine and the isomeric propanol and butanol amines.

The preparation of hydroxy aspartates takes place by the Michael addition of the amino alcohol to the unsaturated diester at a temperature of 0° to 100° C. using the starting materials in such proportions that at least 1, preferably 1, olefinic double bond is present for each amino group. Excess starting materials may be removed by distillation after the reaction. The reaction may be carried out solvent-free or in the presence of suitable solvents such as methanol, ethanol, propanol, dioxane, tetrahydrofuran, pyridine, dimethyl formamide, nitromethane and mixtures of such solvents.

The hydroxy-functional prepolymers according to the invention are prepared by reacting the polyisocyanates with the hydroxy aspartates in an amount such that one mole of the hydroxy aspartate (i.e., one equivalent of secondary amino groups) is present for each equivalent of isocyanate groups. While excess amounts of either component may be used, no particular advantages are obtained. Excess hydroxy aspartate is capable of reacting with isocyanate groups in a subsequent curing step. Excess isocyanate will react with the hydroxy-functional prepolymers according to the invention resulting in a partial chain extension reaction. The reaction is preferably carried out by incrementally adding the polyisocyanate to the hydroxy aspartate. The reaction to form the urea groups is conducted at a temperature of 10° to 100° C., preferably 20° to 80° C. and more preferably 20° to 50° C.

The formation of the hydroxy-functional prepolymers may be represented by the following reaction scheme:

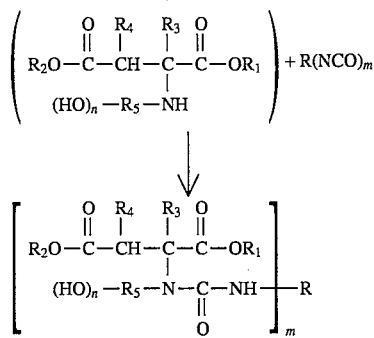

In an alternative embodiment for the preparation of the hydroxy-functional prepolymers containing urea groups, the polyaspartates and the hydroxy aspartates are blended and then reacted with the polyisocyanate component. The aspartate groups react with the isocyanate groups in preference to the hydroxy groups such that the hydroxy groups are present in terminal positions. In accordance with this embodiment the NCO prepolymers containing hydantoin group precursors are formed in situ during the formation of the hydroxy-functional prepolymers according to the invention. The amounts of the polyaspartates and hydroxy aspartates are selected in the same manner as in the two-step process such that they satisfy the guidelines previously set forth, i.e., there should be an excess of isocyanate groups to aspartate groups of the polyaspartate and there should be at one mole of the hydroxy aspartate for each equivalent of excess isocyanate such that the total equivalents of isocyanate groups to aspartate groups is preferably about 1:1.

The hydroxy-functional prepolymers according to the invention may be used in combination with the previously described monomeric diisocyanates or preferably polyisocyanate adducts to form two-component compositions. They may also used in combination with NCO prepolymers, which are prepared from the previously described monomeric polyisocyanates or polyisocyanate adducts, preferably monomeric diisocyanates, and organic compounds containing at least two isocyanate-reactive groups. Suitable compounds containing isocyanate groups include the previously described NCO prepolymers containing hydantoin group precursors and the known NCO prepolymers based on organic polyhydroxyl compounds containing at least two hydroxy groups.

Suitable polyhydroxyl compounds include high molecular weight compounds having molecular weights of 400 to about 6,000, preferably 800 to about 3,000, and optionally low molecular weight compounds with molecular weights below 400. The molecular weights are number average molecular weights ($M_n$) and are determined by end group analysis (OH number).

Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred. Further details concerning the low molecular weight compounds and the starting materials and methods for preparing the high molecular weight polyhydroxy compounds are disclosed in U.S. Pat. No. 4,701,480, herein incorporated by reference. The NCO prepolymers generally have an isocyanate content of about 0.5 to 30% by weight, preferably about 1 to 20% by weight, and are prepared in known manner by the reaction of the above mentioned starting materials at an NCO/OH equivalent ratio of about 1.05:1 to 10:1 preferably about 1.1:1 to 3:1.

At some point during the preparation of products from these two-component compositions, it is necessary to convert the urea groups present in the hydroxy-functional prepolymers to hydantoin groups by heating to an elevated temperature to 60° to 240° C., preferably 80° to 200° C. and more preferably 100° to 140° C. The formation of the hydantoin groups is accompanied by the elimination of a monoalcohol. The hydantoin groups may be formed 1) by heating the hydroxy-functional prepolymer before it is blended with the polyisocyanate component, 2) by heating the two-component composition during the formation of the urethane groups or 3) by heating the product obtained after the formation of urethane groups. For purposes of illustration, the following formula sets forth the hydantoin structure obtained by heating the hydroxy-functional prepolymer, i.e., option 1):

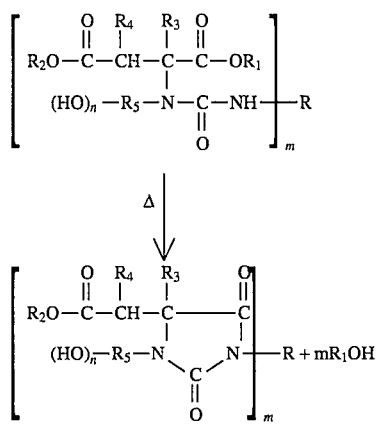

The hydroxy-functional prepolymers may also be used in combination with blocked polyisocyanates or aminoplast resins to form one-component compositions, which are cured at elevated temperatures. In these applications it is not necessary to convert the urea groups to hydantoin groups prior to combining these resins with the blocked polyisocyanates or aminoplast resins. This is because these compositions must be cured at elevated temperatures that are sufficient to convert the urea groups to hydantoin groups.

Suitable blocked polyisocyanates are prepared by blocking the previously described monomeric diisocyanates, polyisocyanate adducts or NCO prepolymers with a monofunctional blocking agent for isocyanate groups. Suitable blocking agents are known and include monophenols; primary, secondary or tertiary alcohols; compounds which easily form enols such as acetoacetic ester, acetyl acetone and malonic acid derivatives; secondary aromatic amines; imides; lactams; oximes; mercaptans; and triazoles.

The hydroxy-functional prepolymers are mixed with the polyisocyanate component, whether in blocked or unblocked form, in an amount sufficient to provide an equivalent ratio of hydroxy groups to isocyanate groups of 3:1 to 1:3, preferably 2:1 to 1:2 and more preferably 1.1:1.0 to 1.0:1.1.

Suitable aminoplast crosslinking agents include aldehyde condensation products of melamine, urea, benzoguanamine or similar known compounds. The most commonly used aldehyde is formaldehyde. These condensation products contain methylol or similar alkylol groups, which are commonly etherified with an alcohol having from 1 to 4 carbon atoms, such as methanol or butanol. The aminoplast resin can be substantially monomeric or polymeric depending upon the desired properties of the resulting product. For example, monomeric melamine resins are preferred because they allow compositions with higher solids contents to be prepared, while polymeric melamine are useful in applications where the use of a strong acid catalyst should be avoided.

Specific examples of suitable aminoplast crosslinkers include hexamethoxymethyl melamine (commercially available as Cymel 303 from American Cyanamid): mixed ether methoxy/butoxy methylmelamine (commercially available as Cymel 1135 from American Cyanamide), polymeric butoxy methylmelamine (commercially available as M-281-M from Cook Paint and Varnish) and high imino polymeric methoxymethyl melamine (commercially available as Cymel 325 from American Cyanamid). Also suitable are other well-known crosslinkers which differ, for example, by degree of polymerization, imino content, free methylol content and ratios of alcohol used for etherification.

These aminoplast crosslinking agents may be utilized in a weight ratio of hydroxy-functional prepolymer containing urea groups to aminoplast resin of about 90:10 to 40:60, preferably about 90:10 to 50:50.

The resulting products prepared from the hydroxy-functional prepolymers according to the invention possess improved hydrolytic, chemical and thermal stability when compared to known ester, carbonates and ethers, which are commonly used as co-reactants for polyisocyanates or aminoplast resins.

Compositions containing the hydroxy-functional prepolymers according to the invention are suitable for various applications such as binder components for the production of coatings, adhesives, foams, elastomers potting compounds, composite matrices and microcellular elastomers. The compositions may also contain other known additives such as catalysts, pigments, fillers, levelling agents, antisettling agents, UV stabilizers and the like.

In a preferred embodiment the compositions are used for the production of coatings by one or more layers to substrates by known methods such as spraying, brush coating, immersion or flooding or by means of rollers or doctor applicators. These coating compositions are suitable for the formation of coatings on various substrates, e.g., metals, plastics, wood, cement, concrete or glass. The coating compositions are particularly suitable for the formation of coatings on sheet steel, for example, for the manufacture of car bodies, machine trim panels, vats or containers. The substrates to be coated by the process according to the invention may be treated with suitable primers before the process according to the invention is carried out.

After the substrates have been coated, the two-component compositions may be cured at either ambient temperature, e.g., by air drying or so-called forced drying, or at elevated temperature. The curing temperature for these two-component systems also depends upon when the urea groups are converted to hydantoin groups. The one-component compositions must be cured at elevated temperatures. It is of great benefit that the resins will not thermally degrade even if they are cured at or exposed to higher than desired temperatures, e.g., which may occur in the event of a breakdown in an application line of a plant.

The invention is further illustrated but is not intended to be limited by the following examples in which all parts and percentages are by weight unless otherwise specified.

EXAMPLES

The following starting materials were used in the examples:

Hydroxy aspartate 1

172.0 parts of diethyl maleate (DEM) was charged into a flask under nitrogen and then 75.0 parts of 3-amino propanol (PA) was added dropwise to the maleate while the temperature was maintained at 60° C. The reaction was completed over a time period of 7 hours.

Hydroxy aspartate 2

228.0 parts of dibutyl maleate (DBM) was charged into a flask under nitrogen and then 75.0 parts of 3-amino propanol (PA) was added dropwise to the maleate while the temperature was maintained at 60° C. The reaction was completed over a time period of 7 hours.

Bis-aspartate 1

116 parts of 2-methyl-1,5-pentanediamine (1.0 mole) were added dropwise with stirring to 344 parts of maleic acid diethylester (2.0 moles) that were previously charged at ambient temperature to a 1 L three necked flask equipped with a stirrer, thermometer and an addition funnel. The amine was added at a rate such that the exotherm did not increase the temperature of the reaction mixture above 50° C. Upon complete addition the contents of the reaction flask were maintained at 50° C. for a period of 12 hours. The resulting product was a clear, colorless liquid having a viscosity of about 90 mPa.s (25° C.) and an amine equivalent weight of about 230.

Polyisocyanate 1

To a 500 ml 3-neck flask equipped with a gas bubbler, mechanical stirrer, thermometer and condenser were added 301.7 parts of hexamethylene diisocyanate and 13.3 parts of 1-butanol. Dry nitrogen was bubbled through the stirred reaction mixture while it was heated at 60° C. When the urethane reaction was complete (about 1 hour), the temperature was raised to 90° C. To the reaction mixture at 90° C. were added 0.214 parts of a 4.4% catalyst solution of trimethylbenzylammonium hydroxide dissolved in 1-butanol. The reaction temperature was maintained at 90° to 100° C. When the reaction mixture reached NCO contents of 40.1% and 37.0%, an additional 0.12 parts of the catalyst solution was added. When the reaction mixture reached an NCO content of 34.8%, the reaction was stopped by adding 0.214 parts of di-(2-ethylhexyl) phosphate. The excess monomer was removed by thin film evaporation to provide an almost colorless, clear liquid having a viscosity of 630 mPa.s (25° C.), an NCO content of 19.7%, and a free monomer (HDI) content of 0.35%. The yield was 48.6%. The yield was calculated by determining the percentage of free hexamethylene diisocyanate in the product prior to distillation.

Polyisocyanate 2

65.88 parts (0.29 equiv.) of bis-aspartate 1 was added dropwise to 48.12 parts (0.58 equiv.) of 1,6-hexamethylene diisocyanate (HDI) at 80° C. The reaction was allowed to continue at this temperature until the formation of urea groups was complete, which took approximately 2 hours.

Preparation of hydroxy-functional polyhydantoin prepolymers

The hydroxy aspartate was charged into a flask under nitrogen atmosphere and then the polyisocyanate was added dropwise to the aspartate with the temperature being maintained below 80° C. until the formation of urea groups was complete. The following table sets forth the amounts of the reactants and additives.

| Example | 1 | 2 | 3 | 4 | 5 | 6 |
|---|---|---|---|---|---|---|
| Iso | HDI[1] | HDI | Polyiso 1 | Polyiso 2 | HMDI[2] | TDI[3] |
| Amount | 38.07 | 46.50 | 118.3 | 78.14 | 55.73 | 66.87 |
| Aspartate | 1 | 2 | 1 | 1 | 1 | 1 |
| Amount | 111.93 | 173.50 | 131.7 | 114.90 | 104.27 | 184.88 |
| NH/NCO | 0.98:1 | 1:1 | 0.98:1 | 0.98:1 | 0.98:1 | 1:1.05 |

[1]1,6-hexamethylene diisocyanate
[2]bis-(4-isocyanatocyclohexyl)-methane
[3]2,4-toluylene diisocyante Following their formation the hydroxy-functional prepolymers containing urea groups according to the invention were mixed with an amine catalyst, triethylene diamine, and then heated under vacuum to 120° C. until the evolution of alcohol stopped, which indicated the completion of hydantoin formation. The following table sets forth the properties of the resulting hydroxy-functional polyhydantoin prepolymers.

| Example | 1 | 2 | 3 | 4 | 5 | 6 |
|---|---|---|---|---|---|---|
| Catalyst | 500 ppm | 1000 ppm | 1000 ppm | 500 ppm | 1000 ppm | — |
| Viscosity[4] (at indicated solids content) mPa · s | 80% - 3844 70% - 420 | 100% - 51,710 | 80% - 16,700 70% - 2000 | 80% - 14,000 70% - 6000 | 80% - 94,000 70% - 4700 | Solid |
| OH Number | 167.2 | 163.7 | 106.0 | 84.5 | 124.0 | — |
| Amine Number | 13.8 | 0 | 0 | 8 | 0 | 0 |

[4]Solution viscosity determined in butyl acetate. All viscosity measured using Brookfield Model DV-II+ viscometer equipped with a CD-52 spindle at 25° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A hydroxy-functional prepolymer containing urea groups and corresponding to the formula

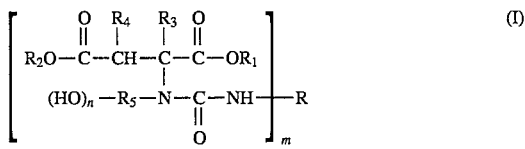

wherein
R represents the radical obtained by removing the isocyanate groups from an organic monomeric diisocyanate, a polyisocyanate adduct or an NCO prepolymer containing hydantoin groups or hydantoin group precursors, $R_1$ and $R_2$ are identical or different and represent organic groups which are inert towards isocyanate groups at a temperature of 100° C. or less, $R_3$ and $R_4$ are identical or different and represent hydrogen or organic groups which are inert towards isocyanate groups at a temperature of 100° C. or less, $R_5$ represents the hydrocarbon radical obtained by removing the amino and hydroxyl groups from an amino alcohol, n has a value of 1 to 3 and m has a value of 2 to 6.

2. The prepolymer of claim 1 wherein $R_1$ and $R_2$ represent a methyl, ethyl or butyl group and $R_3$ and $R_4$ represent hydrogen.

3. The prepolymer of claim 1 wherein m is 2.
4. The prepolymer of claim 2 wherein m is 2.
5. The prepolymer of claim 1 wherein n is 1.
6. The prepolymer of claim 2 wherein n is 1.
7. The prepolymer of claim 3 wherein n is 1.
8. The prepolymer of claim 4 wherein n is 1.
9. The prepolymer of claim 1 wherein R represents the residue obtained by removing the isocyanate groups from an NCO prepolymer containing hydantoin groups or hydantoin group precursors, wherein said NCO prepolymer is prepared by reacting a polyisocyanate with a polyaspartate at a minimum equivalent ratio of isocyanate groups to aspartate groups of 1.6:1.
10. The prepolymer of claim 1 wherein R represents the residue obtained by removing the isocyanate groups from an NCO prepolymer containing hydantoin groups or hydantoin group precursors, wherein said NCO prepolymer is prepared by reacting a polyisocyanate with a polyaspartate at a minimum equivalent ratio of isocyanate groups to aspartate groups of 2:1.
11. The prepolymer of claim 1 wherein R represents the residue obtained by removing the isocyanate groups from an NCO prepolymer containing hydantoin groups or hydantoin group precursors, wherein said NCO prepolymer is prepared by reacting a polyisocyanate with a polyaspartate at a minimum equivalent ratio of isocyanate groups to aspartate groups of 2.1:1.
12. The prepolymer of claim 1 wherein R represents the residue obtained by removing the isocyanate groups from an NCO prepolymer containing hydantoin groups.
13. A hydroxy-functional prepolymer containing urea groups and corresponding to the formula

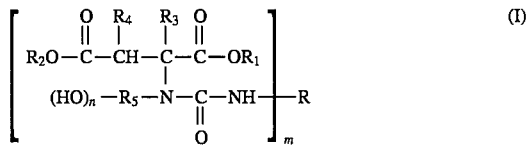
(I)

wherein

R represents the radical obtained by removing the isocyanate groups from an organic monomeric diisocyanate or a polyisocyanate adduct, $R_1$ and $R_2$ are identical or different and represent organic groups which are inert towards isocyanate groups at a temperature of 100° C. or less, $R_3$ and $R_4$ are identical or different and represent hydrogen or organic groups which are inert towards isocyanate groups at a temperature of 100° C. or less, $R_5$ represents the hydrocarbon radical obtained by removing the amino and hydroxyl groups from an amino alcohol, n has a value of 1 to 3 and m has a value of 2 to 6.

14. The prepolymer of claim 13 wherein $R_1$ and $R_2$ represent a methyl, ethyl or butyl group and $R_3$ and $R_4$ represent hydrogen.
15. The prepolymer of claim 13 wherein m is 2.
16. The prepolymer of claim 14 wherein m is 2.
17. The prepolymer of claim 13 wherein n is 1.
18. The prepolymer of claim 14 wherein n is 1.
19. The prepolymer of claim 15 wherein n is 1.
20. The prepolymer of claim 16 wherein n is 1.
21. A two-component coating composition containing as binder the prepolymer of claim 1 and a monomeric diisocyanate or polyisocyanate adduct.
22. A one-component coating composition containing as binder the prepolymer of claim 1 and a blocked polyisocyanate, aminoplast resin or both.

* * * * *